United States Patent
Justus

[15] 3,639,956
[45] Feb. 8, 1972

[54] BEARING SUPPORT AND DRIVE FOR CONTROLLED CROWN ROLL

[72] Inventor: Edgar J. Justus, Beloit, Wis.
[73] Assignee: Beloit Corporation, Beloit, Wis.
[22] Filed: June 25, 1965
[21] Appl. No.: 467,035

Related U.S. Application Data

[63] Continuation-in-part of Ser. No. 457,753, May 21, 1965, Pat. No. 3,286,325.

[52] U.S. Cl..............................29/116, 64/11, 100/162 B, 308/183
[51] Int. Cl.................................................B21b 13/02
[58] Field of Search............100/155, 162, 162 B, 170, 163 A; 29/113, 116, 113 AD, 116 AD; 64/11; 308/183

[56] References Cited

UNITED STATES PATENTS

| | | | |
|---|---|---|---|
| 2,676,387 | 4/1954 | McArn | 29/116 X |
| 3,082,685 | 3/1963 | Moore | 100/163 X |
| 3,138,089 | 6/1964 | Shelton | 100/162 |
| 3,276,102 | 10/1966 | Justus | 29/116 |
| 3,286,325 | 11/1966 | Justus | 29/116 |
| 3,290,897 | 12/1966 | Kuehn | 29/115 X |

*Primary Examiner*—Billy J. Wilhite
*Attorney*—Hill, Sherman, Meroni, Gross & Simpson

[57] ABSTRACT

Support and drive for a controlled crown roll in which a controlled nip pressure is obtained between a roll couple. The roll is in the form of a hollow roll shell journaled on a stationary center shaft, in which pressure means between the center shaft and roll shell compensate for deflection of the shaft by the nip correcting pressure on the roll shell. The shaft is journaled at its ends in pedestals and one end of the shaft extends beyond the end of its pedestal to afford a means for holding the shaft from rotation and to adjust the position of the shaft with respect to the roll shell. A drive sleeve is journaled in this housing on one set of bearings and is journaled on the shaft on an aligned set of bearings and has driving connection with the roll shell. A torque-transmitting drive connection is provided between the sleeve and the shell.

20 Claims, 2 Drawing Figures

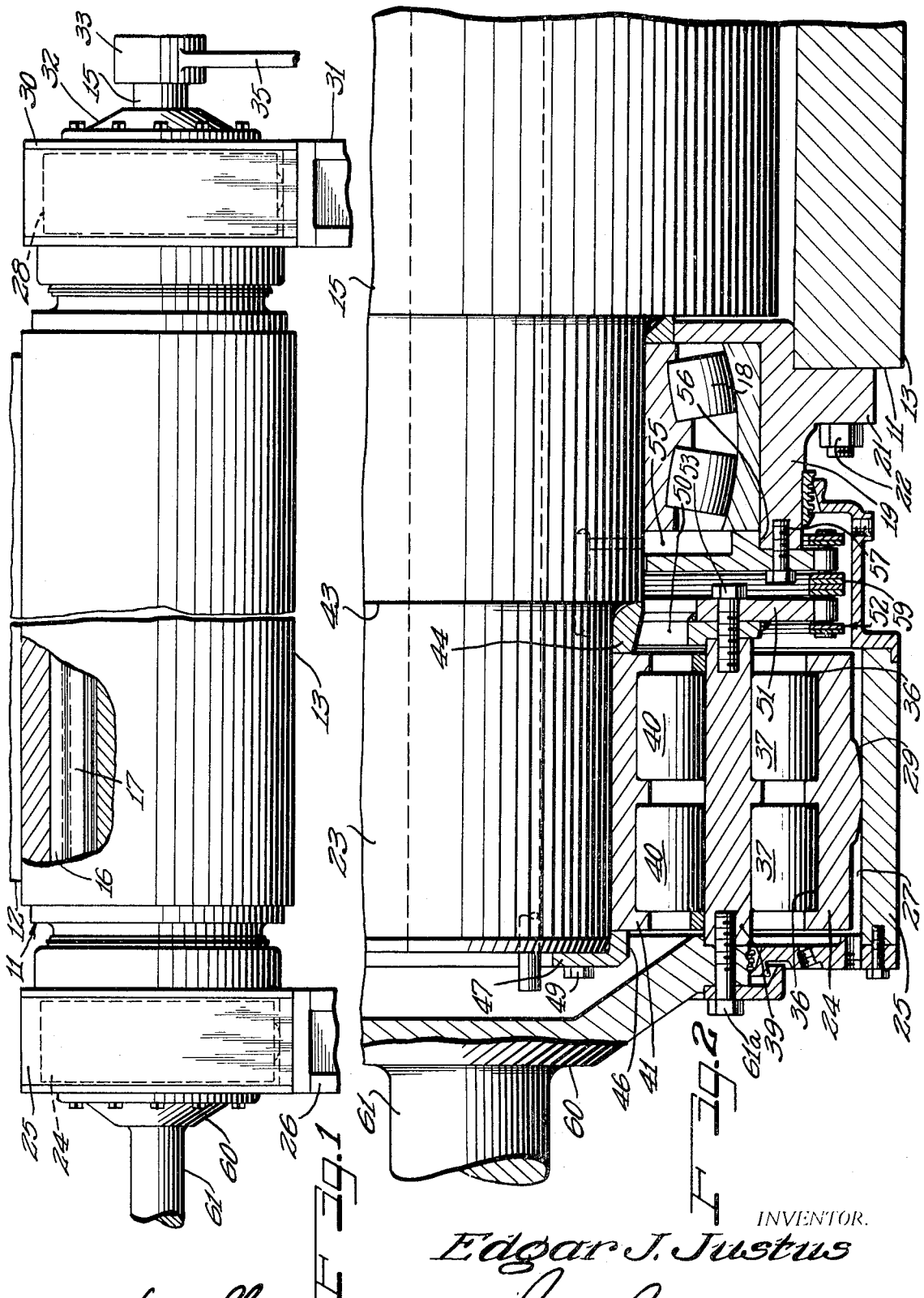

BEARING SUPPORT AND DRIVE FOR CONTROLLED CROWN ROLL

This application is a continuation-in-part of my application, Ser. No. 457,753, filed May 21, 1965 for "SUPPORT AND DRIVE FOR CONTROLLED CROWN ROLL," and now U.S. Pat. No. 3,286,325, dated Nov. 22, 1966.

A principal object of the present invention is to improve upon the supports and drives for controlled crown rolls heretofore in use, by rotatably supporting the roll on its stationary center shaft and by driving the roll through the support for the center shaft.

A further object of the invention is to provide a deflection-compensating support for the stationary center shaft of a controlled crown roll arranged with a view toward utmost efficiency and compactness in construction and operation.

A still further object of the invention is to provide an improved support for the stationary center shaft of a nip-correcting crown roll compensating for deflection of the shaft by the nip-correcting pressures on the roll, in which the center shaft is supported on at least one antifriction bearing and in which one bearing race forms a drive member for the crown roll.

Still another object of the invention is to provide an improved form of controlled crown roll having a stationary center shaft, forming a reaction member for the nip-correcting pressures on the roll, in which bending of the shaft by the nip-correcting pressures on the roll is compensated for by supporting the shaft on its end on supports rockable about axes extending transversely of the axis of rotation of the roll, in which at least one support forms a bearing-casing for a drive ring rotatably driving the crown roll.

A still further object of the invention is to provide a deflection-compensating support for the stationary center shaft of a crown roll in which the center shaft is supported on supports rockable about axes extending transversely of the axis of rotation of the roll and spaced radially therefrom, in which one of the supports forms bearing races for a plurality of radially spaced antifriction bearing members, and in which an inner and outer bearing race for the radially spaced bearing members is rotatably driven about the support and has flexible-coupling drive connection with the crown roll.

These and other objects of the invention will appear from time to time as the following specification proceeds and with reference to the accompanying drawings wherein:

FIG. 1 is a view in side elevation of a controlled crown roll supported in accordance with the principles of the present invention, with certain parts of the roll broken away and certain other parts shown in longitudinal section; and FIG. 2 is a fragmentary vertical longitudinal sectional view taken through one end portion of the controlled crown roll shown in FIG. 1 and illustrating the support for the stationary center shaft of the roll and the drive from the center shaft to the crown roll.

In the embodiment of the invention illustrated in the drawings, I have shown a controlled crown roll assembly 11 which operates in a roll couple with a second roll 12, as in my copending application Ser. No. 339,998 filed Jan. 24, 1964 now U.S. Pat. No. 3,276,102.

The roll assembly 11 includes an elongated hollow cylindrical roll shell 13 having an inner stationary core or center shaft 15 extending through the center thereof and beyond opposite ends thereof. The center shaft 15 is hollow, to accommodate the passage of fluid pressure lines thereinto to pressurize a crown controlling pressure shoe 16 and to receive lubricating lines for lubricating the roll shell bearings. The crown controlling pressure shoe 16 is radially extensible from the periphery of the shaft 15 into slidable engagement with the inner surface of the roll shell 13. The shoe 16 is rockably mounted on a rectangular piston 17, recessed within the center shaft and extending for substantially the length thereof, as in my aforementioned application Ser. No. 339,998 now Pat. No. 3,276,102. The pressure shoe 16, the piston 17, the mounting for the piston in the center shaft 15 for extensible movement with respect thereto, and the fluid-pressure means for applying fluid under pressure to the piston to extend the piston with respect to the periphery of the center shaft 15 and more clearly shown and described in my U.S. Pat. Nos. 3,119,324 and 3,276,102 so need not herein be shown or described further.

The roll shell 13 is shown in FIG. 2 as being supported at one end on the shaft 15 on a self-aligning bearing 18. The opposite end of the roll shell 13 is supported on a similar bearing in a similar manner. The self-aligning bearing 18 is herein shown as being a spherical roller bearing, but may be of any conventional form. As herein shown, the outer race of the self-aligning bearing 18 is supported in a bearing support 19 having a flange 21 spaced inwardly of the inner end thereof and extending radially outwardly therefrom. The outer periphery of the bearing support and inner face of the flange 21 form a right-angled shouldered recess receiving the end and inner periphery of the roll shell 13. The flange 21 is secured to the end of the roll shell 13 as by studs and nuts 22.

The opposite end of the roll shell is journaled on the shaft 15 on a similar self-aligning bearing (not shown), to accommodate bending of the shaft about its opposite ends by the reactions of the nip-applying pressures on the shaft. Since the bearing supports for each end of the roll shell on the shaft 15 are similar, the support for the drive end only need herein be shown or described in detail.

The center shaft 15 is shown in FIG. 2 as having a reduced end portion 23 mounted on a rockable race member 24, carried within a roll support and housing or casing 25. The roll support and housing or casing 25 may be supported on a suitable pedestal 26 at its lower end. The housing or casing 25 has a generally cylindrical inner peripheral wall 27 engaged by a lug 29, depending from the race member 24 and having a rockable bottom surface rockably engaging the cylindrical wall 27 and rocking thereabout about an axis extending transversely of and spaced radially of the longitudinal axis of the shaft 15, as the shaft bends by the reaction of the nip correcting reactions thereon.

The opposite end of the shaft 15 is mounted on a rockable support 28 rockably supported in a support housing 30 mounted on and extending upwardly of a pedestal 31 in the same manner the race member 24 is rockably mounted in the housing 25. The support and its housing, therefore, need not herein be shown or described further. The center shaft 15 extends through an end plate 32 for the housing 30 and has a collar 33 keyed or otherwise secured thereto having a torque arm 35 depending therefrom. The torque arm 35 is shown in FIG. 1 as being broken away and serves to retain the center shaft 15 from rotation and to adjustably position said shaft to locate the center of the shoe 16 and piston 17 exactly at the nip between the rolls 12 and 13. The torque arm and its function are well known to those skilled in the art so need not herein be shown or described further.

The race member 24 has an inner peripheral surface having spaced inner races 36 recessed therein, forming the outer races of antifriction bearing members herein shown as being in the form of rollers 37. The inner races for the rollers 37 are formed in the outer periphery of common sleeve or race member 39, the inner periphery of which forms a race for radially spaced antifriction bearing members, herein shown as being in the form of rollers 40. The inner races for the rollers 40 are formed on the outer periphery of a race member 41, which may be lightly pressed on the reduced end portion 23 of the shaft 15. The race member 41 is spaced from a shouldered end portion 43 of the shaft 23 by a spacer ring 44 and is retained in position by an inwardly extending axial flange 46 of the retainer 47, secured to the end of the center shaft 15 as by machine screws 49.

The reduced end portion 23 of the shaft 15 is thus supported on the race member 24 through the respective sets of outer and inner rollers 37,37 and 40,40 through the sleeve or race member 39, forming an outer race for the inner of said rollers and an inner race for the outer of said rollers, and rotatably mounted on said rollers form movement about the axis of rotation of the roll shell 13.

The sleeve or race member 39 forms a drive member for the roll shell 13 and is shown as being partially recessed within an annular spacer 50 at its inner end. The annular spacer 50 is abutted at its inner end by an annular drive member 51 of a flexible coupling 52. Machine screws 53, extending through the drive member 51 and spacer 50 and threaded in the end of the race member 39, are provided to retain said drive member to said race member and to drive said drive member from said race member. An inner drive member 55 is spaced inwardly of the drive member 51 and has an inner shouldered recess 56 receiving the outer end of the bearing support 19 and secured thereto, as by machine screws 57. The drive members 51 and 55 are shown as being toothed drive members and are coupled together by the flexible coupling 52 extending thereabout and in the general form of an inlet a flexible chain 59, which is shown as a roller type of chain fitting about the members 51 and 55 and meshing with the teeth of said members and driving one member from the other and compensating for misalignment of said members which may be caused by bending of the shaft 15 about its ends by nip-correcting loads acting on the center of said shaft.

A drive plate 60 is secured to the outer end of the race member 39 as by machine screws 61a. The drive plate 60 has a drive shaft 61 extending outwardly of the center thereof coaxial with the axis of rotation of the roll shell 13 and forming a drive shaft for the race member 39 and roll shell 13. The drive shaft 61 may be driven from a conventional drive coupling or from any other conventional driving device.

It may be seen from the foregoing that an improved form of drive and support has been provided for controlled crown rolls, in which the drive member for the roll is an inner race ring of a three race ring bearing and not only is in the support chain for the center shaft but is freely rotatable about said shaft, to serve as a compact drive member for the crown roll.

It may also be seen that the support and drive for the center shaft and bearing support for the crown roll on the shaft compensates for bending of the shaft by the crown controlling loads acting thereon, effecting bending of the shaft about its ends, and that the entire drive and support is within the peripheral limits of the roll shell, and effects compactness and efficiency in the drive by driving the roll shell by the sleeve or race ring for the inner and outer rollers, forming bearings, for the race ring and a support for the center shaft.

While I have herein shown and described one form in which the invention may be embodied, it may readily be understood that various variations and modifications in the invention may be attained without departing from the spirit and scope of the novel concepts thereof.

I claim as my invention:

1. A roll structure comprising,
 a cylindrical roll shell,
 a center shaft extending along the interior of said roll shell and having crown correcting cooperation therewith,
 bearing means supporting said shell on said shaft and accommodating bending of said shaft by the reaction of the crown correcting pressures thereon,
 support means for the ends of said shaft including supports at opposite ends of said shaft mounting said shaft for rockable movement about axes extending transversely of the axis of rotation of said shell, and accommodating bending of said shaft about its opposite ends by the nip correcting pressures on said shaft between the ends thereof.

2. A roll structure in accordance with claim 1, wherein one of said supports includes a bearing casing,
 and wherein bearings are carried within said casing and include a race member forming a drive member for said roll shell.

3. A roll structure in accordance with claim 1,
 wherein a flexible coupling forms a drive connection between said race member and said roll shell.

4. A roll structure comprising,
 a cylindrical roll shell,
 a center shaft extending along the interior of said shell and having crown-correcting cooperation therewith,
 bearing means rotatably supporting and roll shell on said shaft,
 supports for the ends of said shaft mounting said shaft for rockable movement about an axis extending transversely of the axis of said roll shell and accommodating bending of said shaft by the reaction of the crown-correcting loads thereon,
 one of said supports including a bearing casing and containing bearing means supporting said shaft in said casing, and drive means for said roll shell rotatably journaled in said casing by said bearing means.

5. A roll structure comprising,
 a cylindrical roll shell,
 a center shaft extending along the interior of said roll shell and having crown correcting cooperation therewith,
 bearing means supporting said shell on said shaft adjacent opposite ends thereof,
 supports for the ends of said shaft mounting said shaft for rockable movement about axes extending transversely of the axis of said roll shell and accommodating bending of said shaft of by the reaction of the crown correcting loads thereon,
 the support for at least one end of said shaft comprising a bearing-casing containing a pair of concentric radially spaced bearing members,
 a common race member for said bearing members forming an outer race for the inner of said bearing members and an inner race for the outer of said bearing members,
 said common race member forming a drive member for said roll shell.

6. A crown roll in accordance with claim 5,
 wherein a flexible drive connection is provided between the common race and the roll shell.

7. A roll structure comprising,
 a cylindrical roll shell,
 a stationary center shaft extending along the interior of said roll shell and having crown-correcting cooperation therewith,
 bearing means rotatably supporting said roll shell on said shaft,
 supports for the ends of said shaft, mounting said shaft for rockable movement about axes extending transversely of the axis of said roll shell,
 at least one of said supports including a bearing-casing containing three concentric radially spaced race members, the intermediate of which forms races on its opposite sides for inner and outer bearing members,
 a drive connection to said intermediate race member,
 and a drive connection between said intermediate race member to said roll shell.

8. A roll structure in accordance with claim 7,
 wherein the drive connection between the intermediate race member and the roll shell is a self-aligning flexible drive connection.

9. A roll structure comprising,
 a cylindrical roll shell,
 a nonrotatable center shaft extending axially along the center of said roll shell and having crown-correcting cooperation therewith,
 self-aligning bearing means rotatably supporting said shell on said shaft at opposite ends of said shell,
 supports for said shaft on each end of said shaft and mounting said shaft for rockable movement about an axis extending transversely of the axis of rotation of said shell,
 a drive member for said roll shell rotatably mounted in one of said supports,
 and a flexible drive connection from said drive member to said roll shell.

10. A drive mechanism for a shell-type roll comprising,
 a shaft,
 a hollow roll, bearing means rotatably mounting said hollow roll on said shaft,
support means,
a driving member rotatably mounted within said support means,
bearing means disposed between one end of said shaft and said driving member supporting said end of said shaft on said support means through said drive means,
torque-transmitting means interconnecting said driving member and said hollow roll,
and sealing means disposed about said transmitting member and defining with said support means a reservoir for retaining lubricants for all of said bearing means and said torque-transmitting means.

11. A drive mechanism for a shell-type roll comprising,
a nonrotatable shaft,
a hollow roll,
bearing means rotatably mounting said hollow roll on said shaft,
support means,
a driving member rotatably mounted within said support means,
bearing means disposed between one end of said shaft and said driving member supporting said end of said shaft on said support means through said drive means,
torque-transmitting means disposed about said shaft and interconnecting said driving member and said hollow roll,
and sealing means disposed about said transmitting member and defining with said support means a reservoir for retaining lubricants for all of said bearing means and said torque-transmitting means.

12. In combination,
a nonrotatable shaft,
a roll shell rotatably mounted at either end thereof on said shaft,
the ends of said shaft extending beyond said roll shell,
drive means at one end of said shaft comprising a rotatable drive shaft,
a drive member attached it said drive shaft,
a support and housing member,
first bearing means rotatably supporting said drive member within said housing member,
second bearing means within said drive member coaxially supporting said one end of said shaft in said housing through said drive member,
a sleevelike torque-transmitting member disposed normally coaxially about said shaft between said roll shell and directly geared to both said drive member and said roll shell,
said drive member and said roll shell being the sole means supporting said sleevelike member.

13. A drive mechanism for a shell-type roll comprising,
a nonrotatable shaft,
a hollow roll,
bearing means rotatably mounting said hollow roll on said shaft,
support means,
said shaft extending into said support means,
a driving member,
a bearing assembly disposed about said shaft in said support means,
said bearing assembly comprising a rotatable race connected to said driving member at one end of said race,
a gear member connected to said rotatable race coaxial therewith,
and a coupling member in meshing engagement with said gear member and connected to said shell roll.

14. In combination,
a shaft,
a roll shell rotatably mounted at either end thereof on said shaft,
the ends of said shaft extending beyond said roll shell,
drive means at an end of said shaft comprising a rotatable drive shaft,
a housing member,
bearing means rotatably supporting said drive member within said housing member,
said bearing means comprising a coaxial three-race assembly having bearing elements between the outer and intermediate races and between the inner and intermediate race,
said outer race being nonrotatably carried within said housing member,
said inner race being nonrotatably mounted on said end of said shaft,
said drive shaft being connected to said intermediate race,
and a sleevelike coupling member disposed about said shaft and inter connecting said intermediate race and said roll shell; wherein the improvement comprises means for angularly flexibly connecting said coupling member nonrotatably to said intermediate race and to said roll shell,
said coupling member being angularly deflectable.

15. A drive mechanism for a shell-type roll comprising,
a nonrotatable shaft,
a hollow roll,
bearing means rotatably mounting said hollow roll on said shaft,
support means,
a driving member rotatably mounted within said support means,
bearing means disposed between one end of said shaft and said driving member supporting said end of said shaft on said support means through said drive means,
and torque-transmitting means disposed about said shaft and interconnecting said driving member and said hollow roll; wherein the improvement comprises said torque-transmitting means being formed by an angularly deflectible sleevelike coupling member disposed about said shaft,
and means for angularly flexibly connecting said coupling member nonrotatably to said driving member and said hollow roll.

16. A drive mechanism for a shell-type roll comprising,
a nonrotatable shaft,
a hollow roll,
first bearing means rotatably mounting said hollow roll on said shaft
support means,
a driving member rotatably mounted within said support means,
second bearing means disposed between one end of said shaft and said driving member supporting said end of said shaft on said support means through said driving member,
and torque-transmitting means interconnecting said driving member and said hollow roll.

17. A drive mechanism for a shell-type roll constructed in accordance with claim 16,
wherein said first bearing means is self-aligning accommodating relative bending between the hollow roll and the shaft.

18. A drive mechanism for a shell-type roll constructed in accordance with claim 16,
wherein said torque-transmitting member includes toothed elements on each of said driving member and said roll,
and an annular member bridging between said toothed elements and drivingly meshing with each of the toothed elements and accommodating changes in alignment between said elements.

19. A drive mechanism for a shell-type roll comprising,
a nonrotatable shaft,
a hollow roll,
force transmitting means between said hollow roll and said shaft and extending throughout substantially the length of the roll on one side thereof,
support means,
a driving member,
first bearing means rotatably supporting said driving member within said supporting means, second bearing means disposed between one end of said shaft and said driving member supporting said end of said shaft on said support means through said driving member, said second bearing means being at the same axial location as said first bearing means, means interconnecting said driving member and said hollow roll.

20. A drive mechanism for a shell-type roll comprising, a nonrotatable shaft, a hollow roll, force transmitting means between said hollow roll and said shaft and extending throughout substantially the length of the roll on one side thereof, support means, a driving member, first bearing means rotatably supporting said driving member within said support means, second bearing means supporting one end of said shaft on said support means by means of said driving member, and a flexible coupling interconnecting said driving member and said hollow roll.

* * * * *